Patented Oct. 6, 1942

2,297,959

UNITED STATES PATENT OFFICE 2,297,959

CASEIN SHEET MATERIAL

Herman Heckel, Akron, Ohio, assignor to Marbon Corporation, Gary, Ind., a corporation of Delaware No Drawing. Application March 16, 1938, Serial No. 196,156

1 Claim. (Cl. 106—144)

This invention relates to sheet material and to a method of preparing the same, and more particularly to the manufacture of thin, transparent, flexible films or sheets for use in the wrapping and packaging of articles of various kinds.

It has heretofore been suggested that casein might be used in place of gelatine in the preparation of sheet and film material of this character, but to the best of our knowledge no one has heretofore successfully developed a composition and method for the commercial manufacture from casein of thin, clear, transparent sheet or film material having the requisite degree of flexibility and toughness to render the material suitable for wrapping purposes. In the application of Edouard M. Kratz and Hermann Heckel, Serial No. 630,406, filed August 25, 1932, No. 2,014,937, issued September 17, 1935, however, in addition to describing and claiming a method and apparatus for the manufacture of sheet or film material of this character, there is described but not claimed a composition for use in the preparation of such sheet or film material and a method for preparing such composition.

It is therefore an object of this invention to provide sheet or film material having as its base a protein, which is readily soluble in water or which may be rendered soluble by means of an alkaline or basic reacting substance, the sheet or film material being characterized by its thinness, clear and sparkling transparency, and by its toughness and flexibility, adapting it for use for wrapping purposes.

It is a further important object of this invention to provide a process for preparing such sheet or film material.

Other and further important objects of this invention will become apparent from the following description and accompanying claim.

The starting material of my invention is a protein, which is readily soluble in water or which may be rendered soluble by means of an alkaline or basic reacting substance. Examples of suitable proteins of this type are caseins, such as may be derived from milk, soya beans and other sources.

The first step in my process is the purification of the crude casein. Casein is an amphoteric substance having isolectric point at a pH value of 4.6. This means that casein forms salts with acids at any pH value numerically lower than 4.6 and also forms salts with bases at any pH value numerically greater than 4.6. According to my invention, the pH value of the casein is adjusted to from 4.6 to 5.0 by adding an acid or a base as required, and is then washed with water in order to remove the resulting inorganic salts and any other readily water soluble impurities. It is not necessary to eliminate the calcium radical entirely if present in combination with casein as calcium caseinate. Thorough washing of the casein is very essential in order to remove all water soluble and crystalline substances, the presence of which in my final sheet material would impart undesirable opacity thereto due to surface crystallization.

After the casein has been properly washed with water and its pH adjusted to from 4.6 to 5.0, water is added in the proportion of from 6 to 7 parts of water to one part of casein by weight. The casein is dissolved with a suitable basic substance capable of reacting with the casein to form a water soluble compound. I have found that various caustic alkalies, such as sodium, potassium and lithium hydroxides, ammonium hydroxide and various organic bases, such as alkylamines and hydroxyalkylamines are suitable for this purpose. As an organic base, I may use an alkylamine, such as the amylamines, ethylene diamine, butylamine, and the like, and a hydroxyalkylamine, such as an ethanolamine, viz. triethanolamine, monoethanolamine, diethanolamine, or a mixture of the mono-, di- and triethanolamines, or a polyethanolamine. The poly-ethanolamines are produced by the action of ethylene oxide on triethanolamine. A mixture of one or more of the ethanolamines and an alkali metal hydroxide is likewise satisfactory. A hydroxylamine may also be used.

Of the various basic substances mentioned above, I prefer to use either caustic potash or triethanolamine, or a mixture of the two. Caustic soda has a tendency to produce films that become brittle at higher humidities than do films prepared with caustic potash or an ethanolamine. These latter two basic substances produce films that resist the embrittling effect of low humidities. It is probable that triethanolamine has itself a slight plasticizing effect on the film.

The neutralization of the casein mass is carried out by the addition of the basic substance until the pH value of the solution remains constant at about 6.8, at which point the casein will all be in solution as a soluble caseinate. The casein may be made to dissolve at pH value below 6.8 but I prefer to adjust the solution to this value because I obtain a better reaction subsequently of the casein solution with formaldehyde when the pH value is at this point. The solution will also be fairly satisfactory if the neutralization is continued to a pH value of from 7 to 7.5, but if this is done with the use of an ethanolamine, the final product will have an unpleasant taste, which is probably due to an excess of the ethanolamine. This taste is not so apparent when the pH value is kept below 7, and the product is very satisfactory when the value is about 6.8. For practical purposes, the lower pH limit may be taken as 6.5 and the upper limit as 7.5.

The amount of triethanolamine required to neutralize the casein to a pH value of 6.8 will vary between 8 and 14 parts per hundred parts of casein, by weight, depending upon the ash content of the casein used. The ash content represents the combined calcium.

While it is very easy to wash out any acidic substances which may be combined with the casein, it is much more difficult to wash out the calcium. However, I have found that an ash content of 2½% or less gives a satisfactory final product. Since this combined calcium is acting as a base, it combines with a portion of the casein, so that it is not necessary to use as much of the organic base as would otherwise be necessary. As much as 14 parts of triethanolamine may be required to neutralize 100 parts of casein if the casein is substantially free from calcium. Equivalent reacting proportions of the other basic substances may be similarly employed to put the casein into solution and produce the desired pH.

The casein solution, prepared as described above, is next heated to between 130 and 140° F. and agitated preferably for from 4 to 8 hours with a suitable filter aid, such as a diatomaceous earth, kieselguhr, or the like. This period of contact between the casein solution and the filter aid has been found to give the degree of clarity of solution necessary for obtaining a highly transparent film free from specks and blemishes. After the solution has been agitated with the filter aid for the required length of time, it is filtered, by any method of filtering which will obtain the proper clarity of solution.

A plasticizer is then added in an amount equal to from 5 to 30%, preferably 20%, of the weight of casein (on a dry basis) used. Any suitable hygroscopic liquid, such as a glycerol, glycerine or a polyglycerol, a water soluble glycol, viz. ethylene or diethylene glycol, mono-ethyl or butyl ethers of diethylene glycol, or mixtures thereof, or a deliquescent salt, such as potassium acetate, may be used in place of all or part of the glycerine.

I have found that mixtures of two or more of these plasticizers may advantageously be employed. For instance, a mixture of diethylene glycol and glycerine in the proportions by weight of 1 part of diethylene glycol to 2 to 4 parts of glycerine gives satisfactory results. After adding the plasticizer, the viscosity of the solution is adjusted by the addition of water to an arbitrary value found suitable for forming films or sheet material in accordance with the method described in the application above referred to.

To the clarified and filtered solution, I also may add a number of emulsified substances for imparting certain properties to the finished sheet or film. Various natural or synthetic gums and resins, with or without waxes, mineral oils and the like can be added in the form of emulsions, but I have found that chlorinated diphenyls and gum dammar or mixtures of the chlorinated diphenyls with gum dammar, paraffin wax and a refined white mineral oil are particularly satisfactory.

Chlorinated diphenyls and the oxides thereof are chlorinated derivatives of diphenyl or of diphenyl oxide, which, depending upon the degree of chlorination, range from viscous liquids to fairly high melting point solids. They are resinous in character and insoluble by themselves in water. Other resins, such as gum rosin, and other gums, such as elemi, may be employed.

Since these substances are insoluble, it is necessary to use a dispersing or emulsifying agent. As an emulsifying agent I prefer to use a mixture of alkali metal salts of organic sulphonic acids.

A suitable mixture of sulfonates is known to the trade as "soap H." It comprises certain purified and neutralized hydrocarbon sulfonic acids obtained as a by-product in the manufacture of the so-called "white" oils. In such manufacture, a lubricant fraction of the oil is treated with fuming sulfuric acid. Some of the resulting sulfonic acids are soluble in the oil and others separate as a black sludge with the excess acid. The oil portion is neutralized with caustic soda and extracted with 50% alcohol. The extracted material, consisting mostly of the sodium sulfonates of the hydrocarbons, after further alcoholic purification to eliminate the oil and sodium sulfate, is known as soap H and is both oil and water soluble and mixes well with the gums and resins used. Its function in my composition is to act as an emulsifying agent and it may be replaced by other suitable emulsifying agents, if desired, such as the triethanolamine sulfonate of hydrocarbons of the soap H type, or by triethanolamine oleate.

Soap H, or sulfonated castor oil may be also used without the addition of any resins or gums to give the solution better wetting action toward the surface on which the film is cast. By this is meant, that after the solution is applied to such surface, it has no tendency to coalesce or "oil spot." Soap H and sulfonated castor oil may be added either singly or together in amounts up to 15% by weight of the casein (dry basis). They have a slight plasticizing action in addition to their property of lowering the surface tension of the solution.

Before adding these resinous substances to the casein solution, they are preferably melted together with heat. The following illustrates my preferred proportions, but my invention is not to be construed as limited to the exact proportions shown, since obviously they may be varied somewhat:

| | |
|---|---|
| Gum dammar | parts by weight 2½ |
| Chlorinated diphenyl | parts 2½ |
| Soap H | do 5 |
| Cyclohexanol | do 1 |

From 5 to 50%, but preferably about 11% of of this melted mixture, based upon the dry weight of the casein used, is added to the casein solution. The function of "soap H" in the above formula is that of an emulsifying agent. It may be replaced by other suitable emulsifying agents such as triethanolamine oleate.

The above resinous mixture is melted and poured into a small quantity of casein solution kept at approximately 150 to 170° F., with constant agitation, and the resulting emulsion is then transferred to the main portion of the casein solution.

To obtain a clear film, it is necessary that the gums and resins be highly dispersed, and in order to accomplish this, a very large proportion of the emulsifying agent is necessary. I prefer to use about one part of the emulsifying agent to one part of the mixture of resins or gums to be emulsified. Cyclohexanol is added to the mixture when "soap H" is used because cyclohexanol has the property of assisting dispersions made with soap H. Cyclohexanol may be omitted when other emulsifying agents are used. In place of cyclohexanol, other dispersing assistants, such as methyl alcohol, may be used.

The following example is given as an illustration of suitable proportions but my invention should not be construed as limited to these proportions and specific ingredients, since other substances may be substituted as explained above, and the proportions may be varied within considerable limits:

| | Preferred | Broader range |
|---|---|---|
| | Parts by weight | Parts by weight |
| Protein: casein (purified) | 600 | 600 |
| Basic substance: triethanolamine | 50 | 45 to 85 |
| Plasticizer: glycerine | 120 | 30 to 180 |
| Gums and resins: | | |
| Chlorinated diphenyl | 15 | 0 to 150 |
| Gum dammar | 15 | 0 to 150 |
| Emulsifying agent: | | |
| Soap H | 30 | 0 to 300 |
| Hexalin (cyclohexanol) | 6 | 0 to 60 |

The combined effect of the gums, resins, and emulsifying agent is to give the film more body, greater brilliance, or sheen, greater strength and better resistance to low humidities. For example, if the washed casein be dissolved with sodium hydroxide, a film is obtained which becomes brittle at approximately 35% relative humidity. The combined effect of the resins and emulsifying agents will lower the brittle point to about 30% relative humidity, and when my preferred basic substances, potassium hydroxide or triethanolamine, are used as the dissolving agent for the casein, the resulting film will withstand relative humidities as low as 17 to 20% without becoming brittle.

In casting a composition such as described into sheets or films, a suitable insolubilizing agent, such as an aldehyde, or the like, is added. The effect of such an agent is to render the caseinate insoluble in water and to strengthen the film greatly. For this purpose, I prefer to use a 6% solution of formaldehyde in water. A stronger solution will tend to cause precipitation of the casein at the time the solutions are mixed. My preferred proportion for these solutions is about 1 part of the 6% formaldehyde solution to 25 parts by volume of the casein solution. Since this is more than sufficient formaldehyde to give the maximum insolubilizing action, lesser quantities of formaldehyde may therefore be used. The two solutions should be thoroughly mixed just before use and then promptly cast in continuous films or formed into sheets, since the mixture sets in a few minutes.

It is preferable to mix the solutions continuously in small quantities and immediately and continuously flow the mixture onto a suitable forming belt. A belt having a coating of cellulose nitrate will be satisfactory for this purpose. A suitable machine for use in forming this composition into sheets is described in the copending application of Edouard M. Kratz and Hermann Heckel, Serial No. 630,406, filed August 26, 1932.

After being cast onto the forming or carrier belt, the film on the belt is subjected to a drying operation by passing the belt through heated drier chambers, under controlled temperature and humidity conditions. The film is thereby dried and is then stripped from the carrier belt and wound into a roll in a continuous operation.

The reaction between the casein and organic amine is similar to that between casein and an alkali metal hydroxide and results in the formation of a caseinate of the particular organic amine used. This reaction product is soluble in water. The resinous substances added, however, such as a chlorinated diphenyl, dammar gum, or the like, are not water soluble but may be highly dispersed in the solution of the caseinate by means of suitable dispersing and emulsifying agents.

Chlorinated diphenyls may be used alone or in combination with gums, resins or waxes. Drying oils, such as linseed or tung oil, may also be incorporated into the composition.

Any suitable dye may be used if a colored sheet or film material is desired. For instance, Metanil Yellow will give a satisfactory yellow or gold colored sheet.

The final film or sheet material is characterized by its clear transparency, its homogeneity and its freedom from specks, opaque particles or other blemishes. For most purposes the sheet or film material is cast as a very thin pellicle of the same relative thinness as cellulose acetate and cellulose xanthate, or regenerated cellulose, sheet material. My product is flexible and tough and possesses a relatively good tensile strength. When made from my preferred composition, my sheet or film material is satisfactorily resistant to ordinary climatic changes in temperature and relative humidity and therefore well suited for wrapping and display purposes.

I am aware that numerous details of the process may be varied through a wide range without departing from the principles of this invention, and I, therefore, do not purpose limiting the patent granted hereon otherwise than necessitated by the prior art.

I claim as my invention:

The method of making self-sustaining films composed mainly of casein which are suitable for wrapping and like purposes, and characterized by brilliance or sheen, high strength and resistance to low humidities which comprises emulsifying a molten resin in an aqueous alkali solution of casein to form an aqueous dispersion of resin and caseinate which will not settle out, coating a base with said solution in conjunction with a suitable plasticizer and setting agent, the casein being present in major amount compared with the resin, drying the coating, and stripping the coating from the base.

HERMAN HECKEL.